United States Patent
Yeager

[11] 3,951,193
[45] Apr. 20, 1976

[54] GROOVE IN THE TREAD OF A TIRE

[75] Inventor: Robert W. Yeager, Akron, Ohio

[73] Assignee: The Goodyear Tire & Rubber Company, Akron, Ohio

[22] Filed: July 11, 1974

[21] Appl. No.: 487,695

[52] U.S. Cl. .......................................... 152/209 R
[51] Int. Cl.² ................................................ B60C 11/06
[58] Field of Search ....... 152/209 R, DIG. 1, 330 A, 152/324, 325, 330 R

[56] References Cited
UNITED STATES PATENTS

| | | | |
|---|---|---|---|
| 1,504,694 | 8/1924 | Litchfield | 152/324 |
| 2,706,509 | 4/1955 | White | 152/330 X |
| 3,384,145 | 5/1968 | Wolfer | 152/330 |
| 3,682,220 | 8/1972 | Verdier | 152/324 X |
| 3,707,177 | 12/1972 | Boileau | 152/209 R |

FOREIGN PATENTS OR APPLICATIONS

| | | | |
|---|---|---|---|
| 532,534 | 1/1941 | United Kingdom | 152/209 |

Primary Examiner—Drayton E. Hoffman
Assistant Examiner—Norman L. Stack, Jr.
Attorney, Agent, or Firm—F. W. Brunner; H. E. Hummer

[57] ABSTRACT

A tire having a tread with a wide center groove, which is specially configured and includes a series of diamond-shaped ledges disposed end-to-end along each side of the groove intermediate the open top and enclosed bottom of the groove. At least one slot is disposed in each ledge to enhance traction when the ribs become sufficiently worn that the ledges contact the roadway.

26 Claims, 3 Drawing Figures

GROOVE IN THE TREAD OF A TIRE

BACKGROUND OF THE INVENTION

The invention is particularly well suited for use in truck tires and is directed to a mechanism for improving the traction of a partially worn tread.

Briefly stated, the invention is in a pattern of ribs and grooves provided in the tread of a tire. At least one of the grooves includes a ledge intermediate the enclosed bottom and open top of the groove. At least one slot is disposed in the ledge to increase traction of the tread on the roadway when the ribs adjacent the groove are sufficiently worn that the ledge contacts the roadway.

DESCRIPTION OF THE DRAWING

The following description of the invention will be better understood by having reference to the annexed drawing, wherein.

DESCRIPTION OF THE INVENTION

Figure 1:
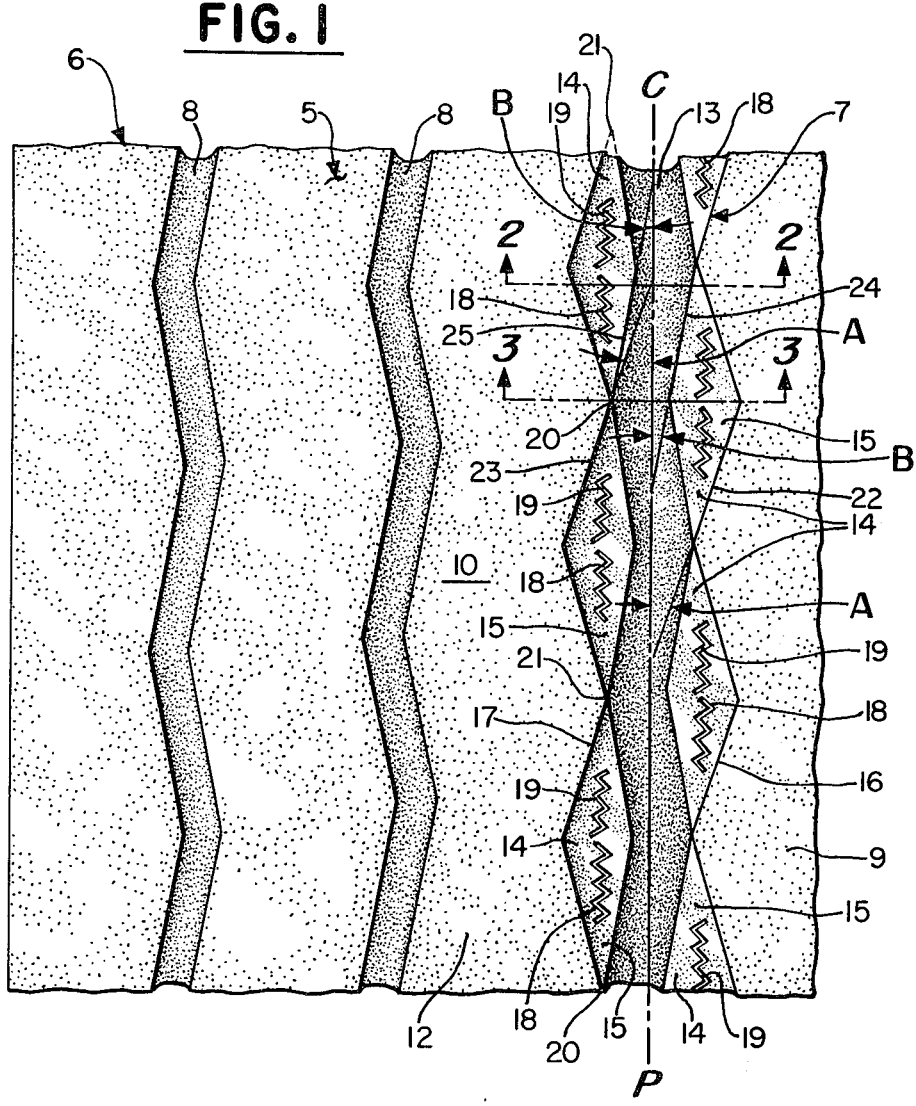
FIG. 1 is a plan view of a portion of a tire tread employing a wide center groove made in accordance with the invention.

Referring generally to the drawing, there is shown a tread 5 of a tire 6 which is composed of conventional components of, for example, a fluid impervious innerliner surrounded by a plurality of carcass plies including reinforcement cords, a tread and pair of sidewalls enclosing the carcass plies and innerliner and terminating at a pair of annular beads and, in some instances, a breaker or belt structure disposed between the carcass plies and tread depending on whether the tire is a bias-belted or radial tire.

The tire tread 5 is preferably provided with an extra wide groove 7 which extends circumferentially around the tire 6 and is centered in relation to a plane CP containing the mid-circumferential centerline of the tread 5, such plane hereinafter referred to as the centerplane. The other circumferentially extending side grooves 8 are normally sized and generally narrower than the wide center groove 7, since it is preferable using a single wide center groove 7 in combination with smaller side grooves 8. The wide center groove 7 separates a pair of centrally disposed ribs 9 and 10 which also extend circumferentially around the tire 6.

Figure 2:
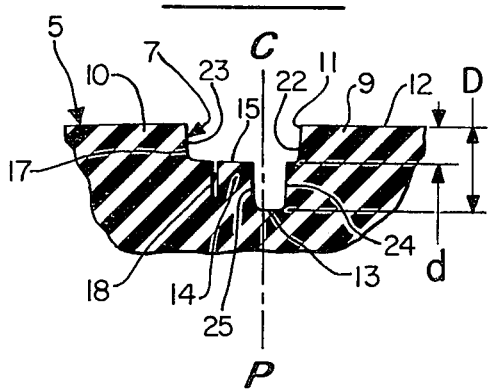
FIG. 2 is a section of the groove viewed from the line 2—2 of FIG. 1.
Figure 3:
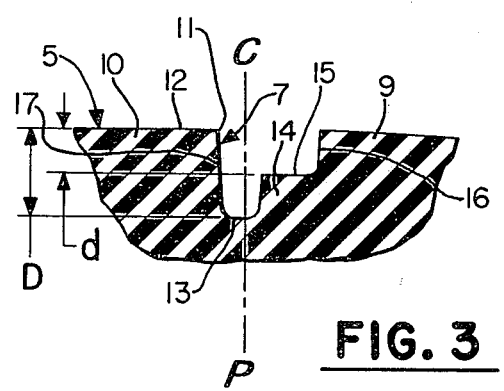
FIG. 3 is a section of the groove viewed from the line 3—3 of FIG. 1.

The wide center groove 7, as best seen in FIGS. 2 and 3, comprises an open top 11 in the road-contacting surface 12 of the tire tread 5, and an enclosed bottom 13 in spaced relation from the open top 11 of the wide center groove 7.

A plurality of adjacently disposed step-like protuberances 14 project into the wide center groove 7. Each of the protuberances 14 include a ledge or shelf 15 intermediate the open top 11 and enclosed bottom 13 of the wide center groove 7.

A series of diamond-shaped ledges 15 are disposed end-to-end, i.e. point-to-point, along each of the opposing sides 16 and 17 of the wide center groove 7. The ledges 15 are generally parallel to the road-contacting surface 12 of the tire 6. The diamond-shaped ledges 15 produce a zig-zag configuration in the enclosed bottom 13 of the wide center groove 7. A plurality of slots 18 and 19 (FIG. 1) are disposed end-to-end in each of the ledges 15, although in some instances it may be more desirable providing a single slot between opposing ends 20 and 21 of each ledge 15. The slots 18 and 19 preferably have a V-shaped cross-section and a zig-zag configuration to produce better traction characteristics.

The wide center groove 7, as best seen in FIG. 1, has a special zig-zag configuration for improving the traction characteristics of the tire 6. This is accomplished by providing the open top 11 of the wide center groove 7 with a zig-zag configuration which is opposite the zig-zag configuration of the enclosed bottom 13 of the wide center groove 7. This particular configuration provides a highly suitable mechanism for increasing the traction of the tire 6 when the ribs of the tire 6 become sufficiently worn that the ledges 15 contact the roadway as the tire 6 rotates. The ledges 15 of a newly molded and vulcanized tire 6, should be spaced from the outer tread surface 12 of the groove 7, a distance $d$ which is from 60 to 70% of the overall depth D of the groove 7 for best results in rejuvenating a partially worn tread.

The sides 22 and 23 (FIG. 2) forming the top groove portion 11 and the sides 24 and 25 forming the bottom groove portion 13, are disposed at angles A and B, respectively, which are in the broad range of from 10° to 25° measured in relation to the centerplane, or a plane parallel thereto, when the tire 6 is molded and vulcanized and uninflated. It was found that the best results were achieved when the angles A and B were in the narrower range of from 15° to 20° measured in a likewise manner.

Each pair of opposing sides 22 and 23, and 24 and 25 of the top and bottom groove portions 11 and 13 were made to alternately converge and diverge in the same direction circumferentially around the tire 6 to provide a series of venturi-like sections, especially in the bottom groove portion 13, for facilitating the flow of water through the groove portions 11 and 13 when the tire 6 rolls over a wet, or water-ladened surface. The width of the groove portions 11 and 13 was made to vary by about 80% from the narrowest to the widest sections of the groove portions 11 and 13.

Thus, there has been described a tire with a specially configured groove which is wider than grooves normally found in the tread of a tire. Wide grooves of this type are preferably disposed circumferentially around the tire for best results. Moreover, it is preferable using this type groove nearer the center of the tread, e.g. as a single main center groove in combination with narrower side grooves, or as a pair of spaced center grooves forming between them a solid, main center rib in the tread of the tire. The specially configured groove can be narrowed considerably while maintaining the zigzag relationship of the enclosed bottom and open top of the groove, by undercutting the enclosed bottom, such that the diamond-shaped ledges along each side of the groove are still end-to-end, but in spaced relation.

What is claimed is:

1. A tire comprising a tread, a pair of sidewalls extending from the tread and terminating at at least one pair of beads, the tread including a pattern of ribs and grooves, at least one of the grooves having an enclosed bottom and open top with a zig-zag configuration that extends circumferentially around the tire and comprising:
   a. a plurality of step-like protuberances disposed end-to-end in the bottom of the groove and extending therefrom towards the top of the groove, the protuberances having outer, exposed ledges which are intermediate the bottom and top of the groove, the protuberances being so located and shaped as to change to zig-zag orientation of the groove adjacent the bottom from that adjacent the top; and b. at least one slot disposed in each of the ledges for increasing traction in the tire when the tread becomes sufficiently worn that the ledges contact the roadway during rotation of the tire.

2. The tire of claim 1, wherein a groove containing a ledge and slot is centrally disposed circumferentially around the tread of the tire.

3. The tire of claim 1, wherein a pair of grooves containing ledges and slots are centrally spaced circumferentially around the tread of the tire forming between them a solid center rib in the tread of the tire.

4. The tire of claim 1, wherein the zig-zag configuration of the groove adjacent the top thereof, is opposite the zig-zag configuration of the groove adjacent the bottom thereof.

5. The tire of claim 4, wherein the ledges are diamond-shaped and end-to-end along each of the opposing sides of the groove.

6. The tire of claim 5, wherein the ledges are parallel to road-contacting surfaces of adjacent tread ribs which the groove separates.

7. The tire of claim 6, wherein a pair of separated slots are disposed end-to-end in each of the ledges.

8. The tire of claim 7, wherein each slot has a zig-zag configuration.

9. The tire of claim 8, wherein each slot has a V-shaped cross-section.

10. A tire comprising a tread, a pair of sidewalls extending from the tread and terminating at at least one pair of beads, the tread including a pattern of ribs and grooves, at least one circumferential groove comprising:

a. a plurality of diamond-shaped ledges disposed end-to-end along each of the opposing sides of the groove, the ledges along one side of the groove being positioned relative to the ledges along the other side of the groove, such that the bottom of the groove therebetween has a zig-zag configuration which is opposite the zig-zag configuration of the open top of the groove; and b. at least one slot disposed in each of the ledges.

11. The tire of claim 10, which includes a pair of zig-zag slots disposed end-to-end in each of the ledges.

12. The tire of claim 11, wherein the ledges are parallel to the ground-contacting surface of the ribs adjacent the groove.

13. The tire of claim 12, wherein a single groove containing the slotted ledges is centrally disposed on the tread and is wider than the narrower grooves alongside the wider center groove.

14. The tire of claim 13, wherein the slots in the ledges have a zig-zag configuration.

15. The tire of claim 10, wherein a pair of grooves containing slotted ledges are centrally spaced circumferentially about the tread of the tire forming between them a solid center rib in the tread of the tire.

16. The tire of claim 15, wherein the enclosed bottom of each of the pair of grooves is undercut such that the diamond-shaped ledges along each side of the grooves are equally spaced.

17. The tire of claim 10, wherein each of the ledges in a newly molded and vulcanized tire is spaced from adjacent outer surfaces of the tread a distance (d) which is from 60 to 70 percent of the overall depth (D) of the groove.

18. The tire of claim 10, wherein opposing sides of the groove are parallel and disposed at angles in the broad range of from 10° to 25° measured in relation to the centerplane of the tire when it is molded, vulcanized, and uninflated.

19. The tire of claim 18, wherein sides of the groove are disposed at angles in the narrow range of from 15° to 20°.

20. The tire of claim 10, wherein at least one pair of opposing sides forming the groove, alternately converge and diverge in the same direction circumferentially around the tire.

21. The tire of claim 20, wherein the at least one pair of opposing sides form the bottom zig-zag groove configuration.

22. A tire comprising a tread, a pair of sidewalls extending from the tread and terminating at, at least one pair of beads, the tread including a pattern of ribs and grooves, at least one circumferential groove comprising:

a. an upper groove portion having a zig-zag configuration; and b. a lower groove portion spaced from the surface of the tread and having a zig-zag configuration which is opposite that of the upper groove portion, such that the upper groove portion figuratively zigs when the lower groove portion zags.

23. The tire of claim 22, wherein the sides of the upper and lower groove portions are disposed at angles in the range of from 10 to 25 measured in relation to the centerplane of the tire, or a plane parallel thereto.

24. The tire of claim 22, wherein the sides are disposed at angles in the narrower range of from 15° to 20°.

25. The tire of claim 24, wherein at least one pair of opposing sides of the groove portions alternately converge and diverge in the same direction circumferentially around the tire.

26. The tire of claim 25, wherein the at least one pair of opposing sides form the bottom groove portion.

* * * * *

UNITED STATES PATENT OFFICE
CERTIFICATE OF CORRECTION

PATENT NO. : 3,951,193
DATED : April 20, 1976
INVENTOR(S) : Robert W. Yeager

It is certified that error appears in the above-identified patent and that said Letters Patent are hereby corrected as shown below:

Claim 1, line 5 (column 3) before "zig-zag" "to" should be -- the --.

Signed and Sealed this

Sixth Day of July 1976

[SEAL]

Attest:

RUTH C. MASON
Attesting Officer

C. MARSHALL DANN
Commissioner of Patents and Trademarks